APPARATUS FOR FILLING CARTONS WITH COTTAGE CHEESE AND THE LIKE

Filed July 11, 1958 5 Sheets-Sheet 1

INVENTORS
MARVIN A. GARDNER
AND JOHN H. LUDWIG
BY
ATTORNEY

INVENTOR.
MARVIN A. GARDNER
AND JOHN H. LUDWIG
BY
ATTORNEY

INVENTORS
MARVIN A. GARDNER
AND JOHN H. LUDWIG
BY
ATTORNEY

INVENTORS
MARVIN A. GARDNER
AND JOHN H. LUDWIG
BY
ATTORNEY

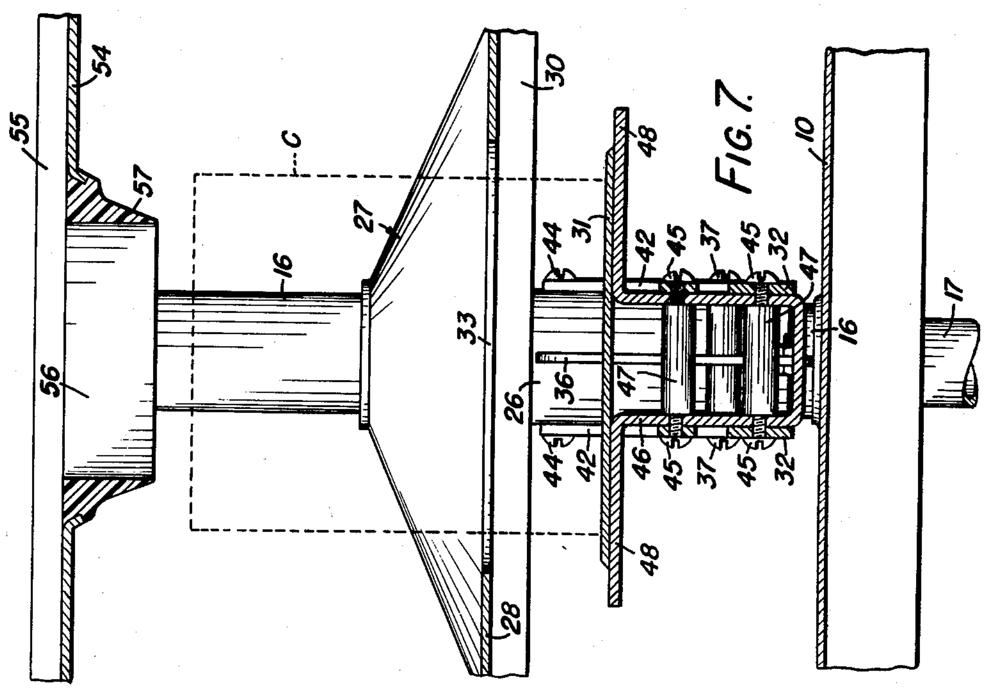
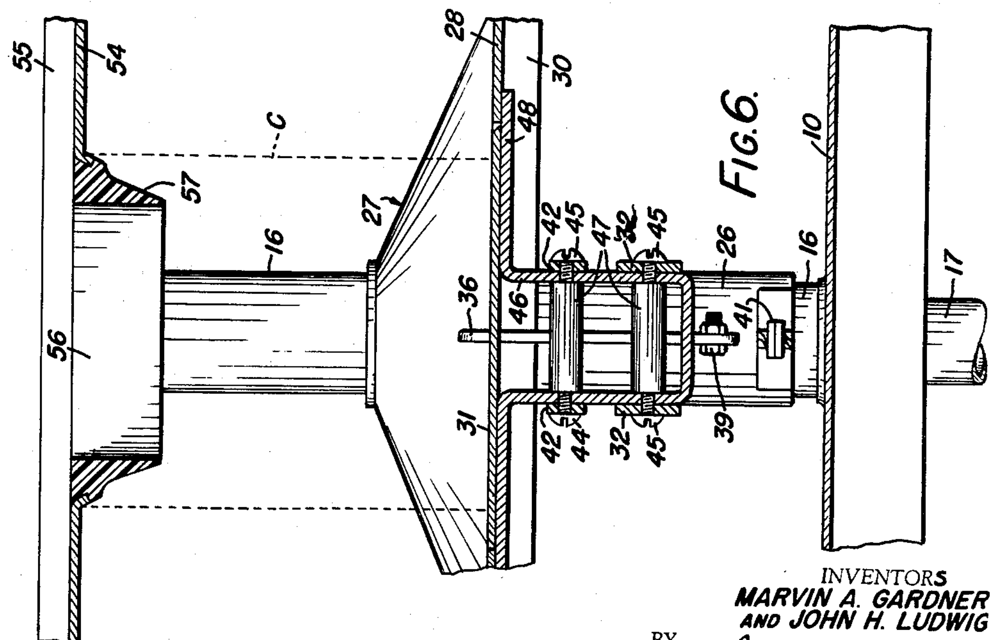
INVENTORS
MARVIN A. GARDNER
AND JOHN H. LUDWIG
BY
B. H. Schlesinger
ATTORNEY United States Patent Office 2,932,329

Patented Apr. 12, 1960

1

2,932,329

APPARATUS FOR FILLING CARTONS WITH COTTAGE CHEESE AND THE LIKE

Marvin A. Gardner, Fairport, and John H. Ludwig, Rochester, N.Y., assignors, by mesne assignments, to M. Sanford Abbey, Brighton, and John H. Ludwig, Rochester, N.Y.

Application July 11, 1958, Serial No. 747,971

12 Claims. (Cl. 141—132)

This invention relates to a machine for filling cartons with cottage cheese and similar materials.

The small dairy business, which cannot afford expensive automatic dispensing machinery, faces a difficult task in packaging its cottage cheese economically. Usually, cottage cheese is packaged manually, by scooping it from a larger container in which it is made, into the smaller cartons in which it is sold. Cottage cheese, however, tends to settle, and its density at the bottom of the large container, in which it is made, may be quite different from its density at the top thereof. Stirring a large container of cottage cheese is very difficult and usually is not very effective. Because of density differences, the weight of the packaged cartons may vary widely. It is frequently necessary, therefore, to check the weight of each carton that is hand-packed, to be sure both that it contains a lawful weight, and that it is not excessively overweight. A few overweight cartons in the course of a day might mean a serious financial loss to the packer at the end of a year.

The labor that is involved in manual packaging of cottage cheese in cartons is also expensive. This makes the dairyman's cost of producing the packaged cottage cheese quite high. It makes it difficult for the small dairy to compete successfully with larger organizations that can afford expensive machinery that fills cartons and checks their weight automatically.

One object of the present invention is to provide a machine for loading cottage cheese into cartons, that is reasonable in cost and within the reach of the small dairy business.

Another object of the invention is to provide a machine for filling cartons with cottage cheese, that is simple to operate and that is accurate in its operation.

Another object of the invention is to provide a machine of the character described, that can be used to fill cartons of different sizes.

Another object of the invention is to provide a machine of the character described that will condition the cheese so that the cartons are filled with a product that is substantially uniform in character.

Another object of the invention is to provide a machine of the character described that has relatively few parts, that is easily cleaned, and that is inexpensive to operate.

Still another object of the invention is to provide a simple machine for filling cartons with cottage cheese, that will agitate the cheese to render it of substantially uniform density throughout, and that will maintain a substantially constant pressure head on the cheese, so that the cartons can be filled volumetrically with a high degree of accuracy.

Other objects of the invention will be apparent hereinafter from the specification and from the recital of the appended claims.

In the drawings:

Fig. 1 is a fragmentary side elevation of a machine for filling cartons with cottage cheese, constructed according to one embodiment of this invention, showing a carton on the loading platform, and showing in dotted lines a second carton at the cheese dispensing station;

2

Fig. 6 is a section on an enlarged scale taken on the line 6—6 of Fig. 5, looking in the direction of the arrows, and showing the loading platform flush with the track ring of the machine, and showing in dotted lines a carton on the loading platform;

Fig. 7 is a section, on the same scale, also taken along the line 6—6 of Fig. 5, looking in the direction of the arrows, and showing the loading platform in its lowered position below the level of the track ring, and showing in dotted lines a carton on the loading platform;

Figure 1:
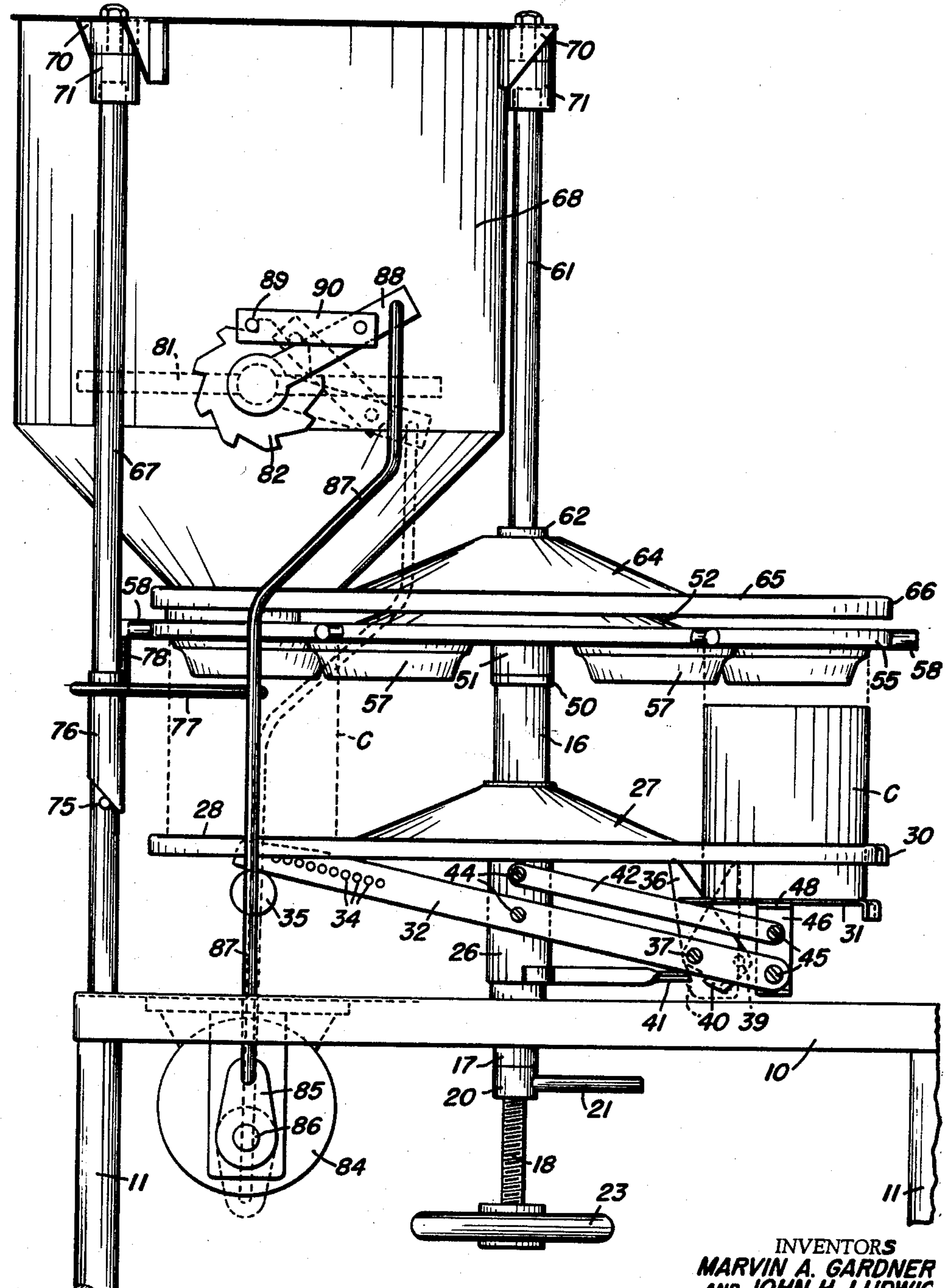

In the embodiment of the invention illustrated in the drawings, cartons, in which the cottage cheese is to be packaged, are loaded on a manually indexable table at a loading station, and are carried by the table successively, as the table is indexed, into registry with the dispensing opening of a hopper which dispenses cheese by gravity into each carton, when the carton registers with the dispensing opening. At the loading station there is a platform supported by a weighted beam. The weight on the beam may be used to weigh each carton, or may be used simply to counterbalance the platform. In either event, when a filled carton is indexed back to the loading station onto the platform, the platform is depressed and may be locked down while the filled carton is removed and a new, empty one is put in its place. To prevent dumping cheese onto the carton-supporting table of the machine, a detector is provided which will lock the indexing table against rotation if there is no carton in place to receive the cheese. There are openings in the table to receive the cartons and if there is no carton in place, the table will be locked with a land in registry with and closing the dispensing opening. The detector is positioned to detect the absence or presence of a carton at the station immediately ahead of the dispensing station and before the carton reaches the dispensing station.

Referring now to the drawings, 10 denotes a table top and 11 are the legs for supporting the same. The table top 10 is reinforced by a plate 12 (Fig. 3) and angle-irons 14, that are secured to the table top 10 by bolts 15, or in any other suitable way. The plate 12 and the table top 10 are formed with aligned circular apertures. The tubular, cylindrical main column 16 of the machine projects through these apertures at its lower end and is welded to the plate 12.

Figure 4:
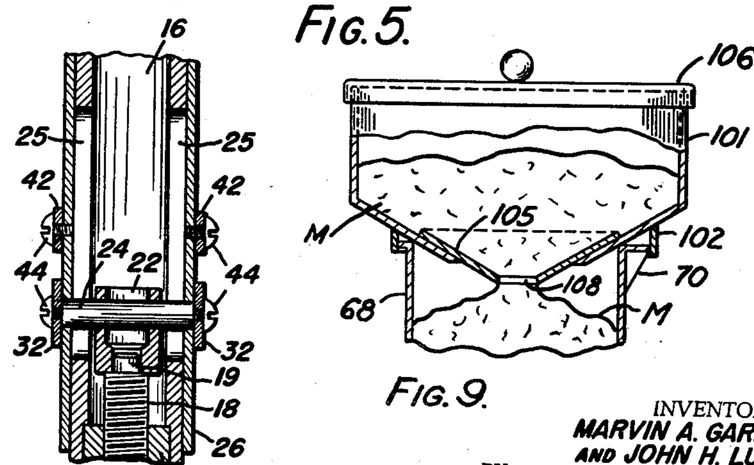
Fig. 4 is a fragmentary section, on an enlarged scale, showing a portion of the main column of the machine, adjacent its lower end.

The main column 16 at its lower end is counterbored; and a nut 17 is secured in the counterbore. A screw 18 is threaded through the nut 17, and has a portion 19 (Fig. 4) of reduced diameter which is unthreaded and which seats in a hole in a block 22 whose purpose will appear hereinafter. A lock nut 20, that has a turning lever 21 secured thereto, is threaded on the screw 18 and is engaged against the lower end face of the nut 17. A hand wheel 23 is secured to the lower end of the screw 18, to permit the screw 18 to be turned manually.

The block 22 is pivotally connected to a sleeve 26 by means of a pin 24 which extends transversely through block 22 and a pair of diametrally-opposed, axially-extending slots 25 in the main column 16 into the sleeve 26. Sleeve 26 is mounted on the main column 16 for sliding movement thereon.

A supporting plate 27 (Fig. 3) is welded to the upper end of the sleeve 26. The plate 27 has an inner conical portion 29, a flat outer part 28, and a peripheral flange 30.

The plate 27 is cut away, as denoted at 33 (Fig. 5), to provide a recess to receive a platform 31. This platform is mounted normally to be flush with the surface of the plate 28.

Figure 3:
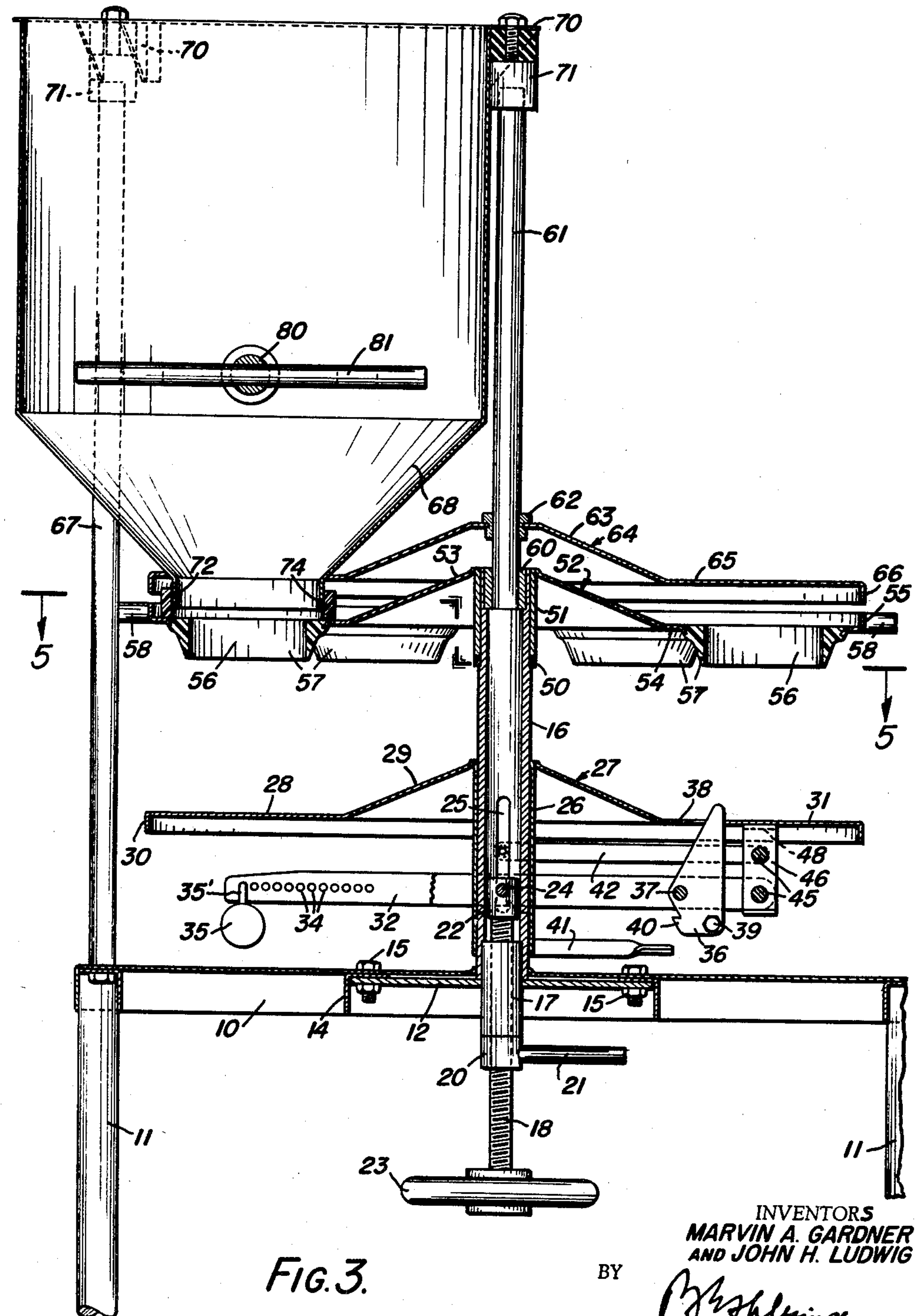
Fig. 3 is a fragmentary section taken generally on the line 3—3 of Fig. 2, looking in the direction of the arrows, the cartons, however, being removed.
Figure 5:
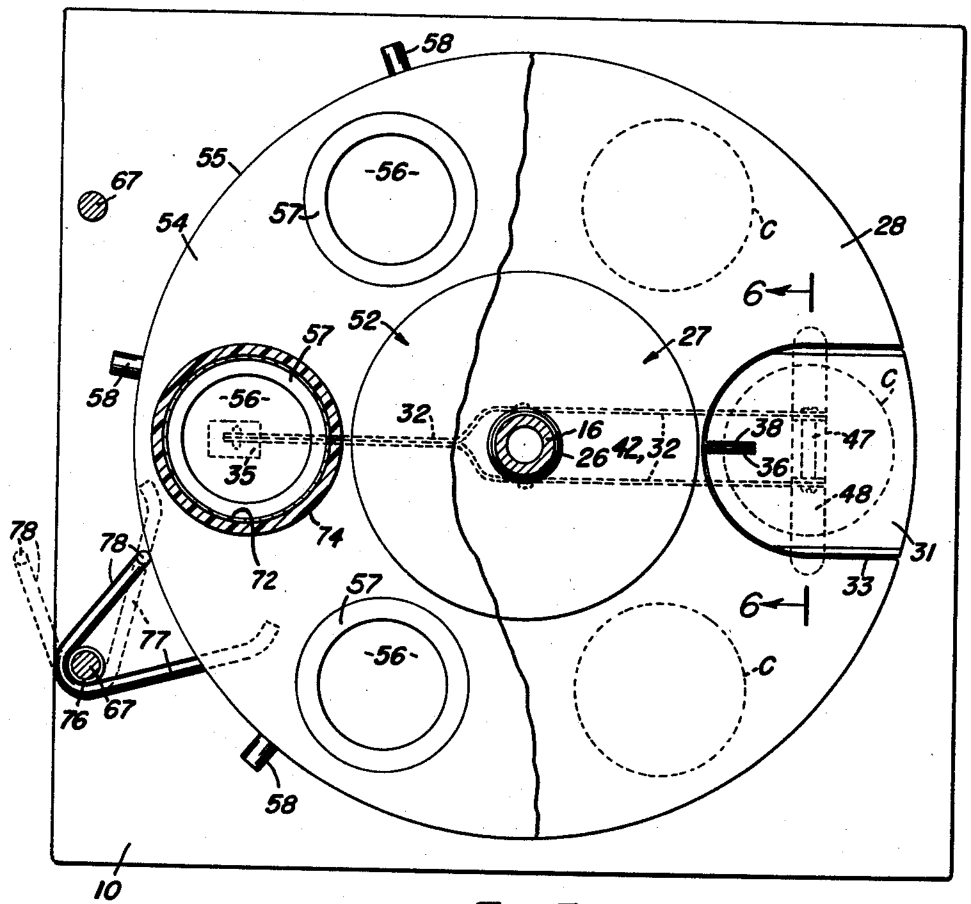
Fig. 5 is a section taken approximately on the line 5—5 of Fig. 3, looking in the direction of the arrows.

A pair of lower beams 32 are pivotally secured by screws 44 (Fig. 4) on the ends of the pin 24 at opposite sides of the main column 16 respectively. At one side of the main column 16, the beams 32 are bent so that they are contiguous, as shown in Fig. 5, and the two beams are formed with a plurality of pairs of aligned apertures 34 (Fig. 3). A counterweight 35 is suspended by a hook 35' from the beams 32 by inserting the hook in one pair of the apertures 34. On the other side of the main column 16, the two beams 32 are extended in spaced, parallel relation, to a location beneath the platform 31. A vertically extending latch 36 is pivotally mounted on a pin 37 intermediate the beams 32. The upper end of the latch 36 projects upwardly through a slot 38 (Fig. 5) in the platform 31; and the latch 36 is held against pivotal movement on the pin 37 by engagement against the radially outer end of the slot 38. The latch 36 is formed with a catch 40 at one side below pivot 37. A stop member 41 is secured to the lower end of the sleeve 26, to project radially outwardly thereof into position to engage the catch 40 when the platform 31 and the beams 32 are lowered by weight of a carton on platform 31 as will be described further hereinafter.

A second pair of beams 42 is pivotally secured to the sleeve 26 above the beams 32 (Fig. 1) by screws 44, in vertical alignment with the lower beams 32. The upper beams 42 extend radially outwardly of the sleeve 26 and beneath the platform 31. A generally U-shaped bracket 46 (Figs. 6 and 7) is pivotally secured between the ends of the lower beams 32 and of the upper beams 42 by screws 45. Spacers 47 are interposed within the bight of the U-shaped member 46, to strengthen the U-shaped member. The upper ends 48 of the arms of the U-shaped member 46 are bent at right angles away from each other (Figs. 6 and 7) and are welded or otherwise secured to the bottom of the platform 31. The ends of these arms 48 project beyond the sides of the platform 31, in position to engage against the bottom of the plate 27, to serve as stops and prevent the platform 31 from moving above the plate 28.

The main column 16 is slightly reduced in diameter adjacent its upper end, and a thrust ring 50 is seated on the shoulder that is provided by the reduced portion. A sleeve bearing 51 is mounted on the column 16 with its lower end engaged against and supported on the thrust ring 50. A table 52, that has an inner, conical portion 53, an outer portion 54, and an upturned peripheral flange 55 is welded or otherwise secured to the upper end of the sleeve bearing 51. The portion 54 of this table is formed in the embodiment shown with six openings 56 that are equi-angularly spaced about the axis of the main column 16. Insert rings 57, of nylon or similar material, are mounted in these openings. Six studs 58 are secured to the flange 55, to project radially outwardly therefrom. The studs 58 are equiangularly spaced about the axis of the table; and each is associated with one of the apertures 56.

The main column 16 is counterbored at its upper end, and a bushing 60 is seated on the shoulder formed by this counterbore. A support rod 61 is secured in the bushing 60 and projects upwardly therefrom in axial alignment with the main column 16.

A grommet 62 is secured to the rod 61, and a cover plate 64 is secured to the grommet 62 in vertically spaced relation to the table 52. The cover has an inner conical portion 63, a flat disc-like portion 65, and a downwardly depending peripheral flange 66.

A pair of rods 67 (Fig. 3) are secured to the table top 10 to project upwardly thereabove parallel to rod 61. These cooperate with the rod 61 to support a conical-bottomed hopper 68 that is mounted between them. The hopper 68 has a plurality of brackets 70 (Figs. 1 and 3) welded or otherwise fastened around its periphery at its upper end. These brackets are supported on rubber cushions 71 that are secured to the upper ends of the support rods 61 and 67. The discharge opening 72 of the hopper 68 is generally cylindrical and has its axis spaced from the axis of the column 16 at the same radial distance as the openings 56 in the table 52. A resilient nylon sleeve 74 is mounted about the outlet 72 and rests upon the upper surface of the flat portion 54 of the table 52.

A pin 75 (Fig. 1) is mounted transversely in one of the support rods 67, with its ends projecting from the opposite sides of this support rod. A sleeve 76 (Figs. 1 and 5) is mounted on this support rod 67. This sleeve is formed with a helical lower end face that engages against the projecting ends of the pin 75. A stop member having a pair of arms 77, 78 (Fig. 5) is secured to the upper end of the sleeve 76. The arm 77 projects into the space between the base plate 27 and the table ring 52. Because of its function, it is referred to hereinafter as a detector arm. The second arm 78 is bent at right angles to provide an upright portion (see Fig. 1) that projects into the path of the studs 58. Because of its function, this arm is hereinafter referred to as the locking arm.

An agitator shaft 80, with radially extending arms 81, is mounted for rotation within the hopper 68. The arms 81 are graduated in size (see Fig. 2) to conform to the contour of the conical bottom of the hopper, and the shaft 80 is disposed so that, as it is rotated, the arms 81 pass in close proximity to the conical bottom surface of the hopper. The shaft 80 is connected through the wall of the hopper to a ratchet wheel 82 that is mounted externally of the hopper.

A motor 84 (Fig. 1) is mounted beneath the table top 10. It drives a crank arm 85 which is mounted on a crank-pin 86. The lower end of a connecting rod 87 is secured to the crank arm 85, and the upper end of this connecting rod is connected to a lever 88 that is rotatably mounted on the outer end of the shaft 80. A pawl 90 is pivotally mounted on the lever 88, to drive the ratchet wheel 82 through its pin 89 as the crank arm 85 rotates.

Figure 2:
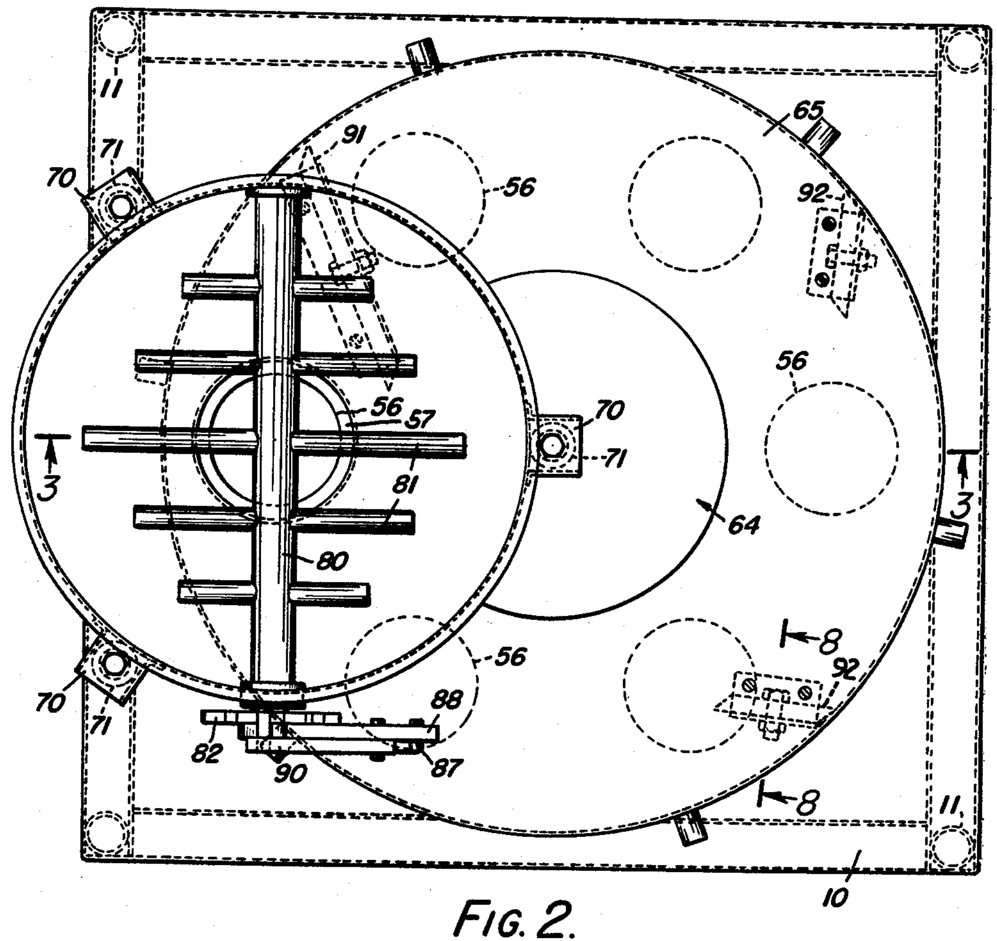
Fig. 2 is a plan view of this machine.
Figure 8:
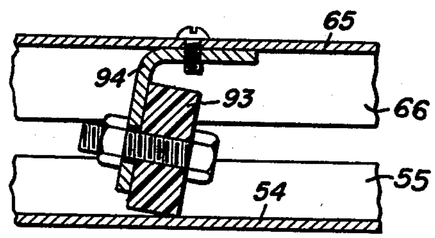
Fig. 8 is a section, on a still more enlarged scale, taken on the line 8—8 of Fig. 2, looking in the direction of the arrows.

Referring now to Figs. 2 and 8, a long scraper 91, and a pair of short scrapers 92, are secured on the lower face of the cover 64 and are disposed with their lower edges in scraping relation to the surface of the flat portion 54 of the table 52. As shown in Fig. 8, each scraper comprises a plastic bar 93 that is secured to the flat portion 65 of the cover 64 by a bracket 94. Thus, as the table 52 revolves beneath cover plate 64, the scrapers will scrape any cottage cheese on the table into the openings 56 of the table.

Figure 9:
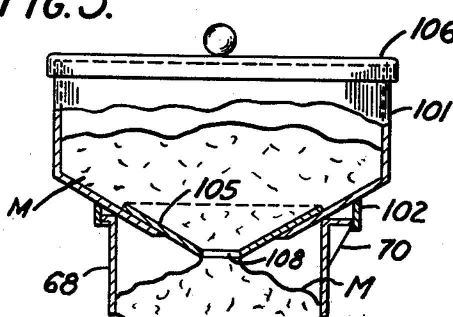
Fig. 9 is a fragmentary partial axial section, partial elevation, on a reduced scale, showing a cheese reservoir mounted on the hopper according to one embodiment of the invention.

Referring to Fig. 9, a wide conically bottomed container or reservoir 101 is adapted to be mounted removably on top of the hopper 68 to supply cheese to the hopper. The container 101 has a ring 102 disposed around and beneath its conical bottom, with offset portions that fit over the brackets 70 to hold the container against rotation relative to the hopper. The container 101 has a central opening in its bottom that communicates with the interior of the hopper 68. A frusto-conical adapter 105, that also has a central opening 106 at its bottom, may be removably seated on the bottom of the container 101, to reduce the size of the orifice between the container 101 and the hopper 68. Several adapters may be provided with different size openings 106, respectively, and one may be substituted for another to control the rate of flow of the cheese from the container into the hopper. A cover 106 removably closes the container 101.

This machine is of particular value in filling wide-mouthed cartons C with cottage cheese. To comply with health requirements, where there is any chance for contact of the parts of the machine with the cottage cheese, the metal parts may be made of highly polished stainless steel, and the plastic parts may be made of molded nylon.

To use this machine, the elevation of the table 27 is adjusted so that the spacing between the portion 28 of this table and the flat part 54 of the table 52 is just sufficient to accommodate a carton C (Fig. 1) of the size that is to be filled. To adjust the elevation of the table 27, the lever 21 is turned to loosen the lock nut 20, and then the crank 23 is rotated to move the block 22 up or down, as desired. The reduced end 19 (Fig. 4) of the screw 17 turns freely within the bore of the block 22. When the proper elevation has been reached, the nut 20 is again tightened up against the nut 17.

The table 52 is then rotated manually, for example by grasping and pushing on one of the studs 58, to bring one opening 56 in this table into registry with the outlet 72 of the hopper, thereby automatically to position another of the openings directly over the platform 31. The platform 31 is then depressed manually. This causes the catch 40 to engage under the projecting end of the stop 41 as shown in dotted lines in Fig. 1. The platform 31 is thus held in horizontal position. An empty carton C is then shoved on the platform 31. As the carton is pushed inwardly on the platform, the side of the carton C engages against the latch 36 and tilts the latch out of engagement with the stop 41. As soon as the carton C is released, then, the weight 35 causes the beams 32 and 42 to move upwardly to raise the platform 31 level with the track portion 28 of table 27, and the opening 56, that is directly over the platform 31, will engage in the open mouth of the carton C and project a short distance into the interior of the carton. The tips of the arms 48 stop the platform 31 when it is flush with the track 28.

The sleeve 76 is then lifted manually and rotated 180°, to move the arms 77, 78 out of the path of movement of the studs 58, so that these arms do not interfere with the loading of the machine. Empty cartons are then placed successively over the insert rings 57, as the table 52 is rotated manually in a clockwise direction relative to Figs. 2 and 5, until an empty carton is disposed beneath the hopper outlet 72, and other empty cartons are secured over the insert rings between the loading platform 31 and the hopper outlet.

At this point, the sleeve 76 is again lifted to be free from the pin 75, and is rotated into operative position as shown in Fig. 5.

A container filled with cottage cheese is placed on top of the hopper 68, and the motor 84 (Fig. 1) is started. The cheese M drops through the orifice 106 of the adapter 105 or through the opening in the bottom of the container if no adapter is used, into the hopper 68. The cheese tends to neck down at this orifice. As long as some cheese is maintained in the container 101, the cheese will drop freely through the orifice to maintain a substantially constant amount of cheese in the hopper 68, so that there is a substantially constant pressure head of cheese above the hopper outlet 22.

Any moisture that condenses on the outer surface of the container 101, and that runs down the side of the container, is prevented from entering the hopper 68 by the ring 102.

The motor 84 in operation drives the agitator shaft 80, to move the vanes 81 to stir the cheese in the hopper, to further assist in achieving uniformity in the consistency of the cheese being packaged. The cottage cheese falls through the discharge outlet of the hopper, through the aligned opening 56 in the table ring 52, and through the insert 57, into the empty carton below the hopper. When this carton has been filled the operator rotates the table 52 to bring another empty carton into registry with the discharge outlet of the hopper.

The weight of the cheese M in the hopper 68 compresses the cushions 71, to drop the hopper and its discharge outlet 72 down, and to cause the sleeve 74 to be pressed down into sealing engagement against the table surface 54. As a full carton is moved away from the discharge outlet of the hopper, the sleeve 74 forms a tight seal against the flat land portions of the table surface 54, between the openings 56, and the surface 54 acts as a valve to prevent further escape of cheese from the hopper.

When the table 52 has been indexed manually far enough for a full carton to reach the loading platform 31, its weight causes the platform 31 to drop down. The counterweight 35 can be adjusted on the beams 32 to the weight of cheese desired in the cartons. However, faster operation can be obtained by wedging the empty cartons on the inserts 57, and then grasping the filled cartons manually and pressing them downwardly against the platform 31 until the platform is low enough for the catch 40 of the latch 36 to engage on the stop member 41. Then, when the filled carton is taken away from the platform 31, the catch 40 will hold the platform 31 down. During the interval of time that is required for a filled carton to be replaced by an empty one, the cottage cheese in the hopper will fill the empty carton that is then disposed below the hopper discharge outlet 72.

As the table 52 is rotated to bring the empty cartons successively to the loading station, the detector arm 77 is successively engaged by the empty cartons, and is pushed to the position shown in dotted lines in Fig. 5 so that the stop arm 78 is moved out of the way of the next adjacent stop 58. If there is no carton in place at a particular position on table 52, however, the detector arm 77 is not moved, and the upright extension of the locking arm 78 engages against the next stud 58 and holds the table 52 against further rotation, thus preventing the cottage cheese from being dispensed through an opening 56 under which there is no empty carton.

When the machine is continuously operated over a period of time, small amounts of cottage cheese will tend to accumulate on the surface of the table 52, on the lands of the table between the openings 56. The long scraper 91 is disposed to sweep this cheese toward the outside of the table surface 54, where the flange 55 prevents it from falling off. Thereafter, the shorter scrapers 92 sweep this cheese into cartons.

Since cheese is usually sold on a weight basis, it is important that the volume of cheese that is placed in each carton correspond quite accurately to the desired weight. The agitator insures that substantially uniform cheese density is maintained in the hopper, so that equal volumes of cheese will have equal weights, thus permitting the cheese to be dispensed volumetrically. A plurality of members 105 can be provided, that have orifices of different sizes, to facilitate the dispensing of cheeses of different degrees of fluency.

The projecting lower portion of each insert ring 57 displaces a predetermined volume in each carton, which serves two purposes. First, this insures that there will be room in the carton for any cheese in the center of the carton, before the insert is withdrawn. Secondly, the size of the inserts 57 can be selected, to displace any desired volume within the cartons, so that a predetermined volume (and weight) of cheese can be loaded into the cartons consistently. Although it is possible to use the weight 35 to determine the weight in the filled carton on the platform 31, it is preferred to operate the machine by volume filling, since more rapid operation ordinarily is possible.

To accommodate cartons of different heights, the elevation of the plate 28 is adjusted in the manner previously described.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A machine for filling cartons having open upper ends, said machine comprising a relatively stationary base adapted to support said cartons, a rotatable table mounted above said base, a dispenser having an outlet and mounted above said table with its outlet directed toward said table, said table being formed with a plurality of openings that are spaced about its axis of rotation for successive alignment with said outlet upon rotation of said table, and means mounted in each of said openings for engaging in the open ends of said cartons to hold the mouths of the cartons in communication with said openings, and to transport the cartons over said base upon rotation of said table.

2. A machine for filling cartons comprising a relatively stationary base adapted to support said cartons, a rotatable table mounted above said base in parallelism therewith, a dispenser having an outlet and mounted above said table with its outlet directed toward said table, said table being formed with a plurality of openings that are spaced about its axis of rotation for successive alignment with said outlet upon rotation of said table, means associated with said table at each of said openings, respectively, for engaging in the mouths of the cartons to hold the cartons in communication with said openings and to transport the cartons over said base upon rotation of said table, a platform mounted in said base in angularly-spaced relation to said outlet and for registry with one of said cartons when another of said cartons is in communication through its associated opening with said dispenser outlet, said platform being mounted for movement in a vertical direction from a position flush with said base to a lower position in which the carton on said platform is disengaged from its associated engaging means, so as to permit removal of the carton from the platform.

3. The machine of claim 2 including means constantly urging said platform in an upward direction, and latch means mounted to be locked when said platform is lowered to remove a carton and to be tripped to release said platform when a fresh carton is placed on said platform.

4. A machine for filling cartons comprising a rotatably mounted table, a hopper mounted above said table on cushions that permit said hopper to move down and up within predetermined limits as the load in said hopper is increased and decreased, respectively, said hopper having an outlet that is directed to discharge toward said table, a resilient sleeve mounted on said hopper and engaging the upper surface of said table about said outlet in sealing relation and to be pressed against said surface in sealing engagement by the pressure of the load in said hopper, said table being formed with a plurality of openings that are spaced about its axis of rotation for successive alignment with said outlet upon rotation of said table, and means associated with said table at each of said openings respectively for engaging cartons with the mouths of the cartons in communication with said openings and for transporting the cartons upon rotation of said table.

5. A machine for filling cartons comprising a rotatably mounted table, a hopper having an outlet and mounted above said table with its outlet directed toward said table, said table being formed with a plurality of openings and lands between said openings, said openings being spaced about the axis of rotation of said table for successive alignment of said openings with said outlet upon rotation of said table, means associated with said table at each of said openings, respectively, for engaging cartons with the mouths of the cartons in communication with said openings and for transporting the cartons upon rotation of said table, and means for detecting the cartons and, in the absence of a carton, for locking the table against rotation in a position in which one of the said lands covers said outlet, wherein said table is formed with a plurality of projecting studs that are associated respectively with said openings, and in which said detecting means comprises a sleeve that is mounted for rotary movement about a vertical axis, and means constantly to urge said sleeve to a predetermined orientation about said axis, a locking arm mounted on said sleeve to project when said sleeve is at said predetermined orientation into the path of said studs for engagement with said studs, respectively, said locking arm being disposed upon engagement with a stud to hold said stud and said table against rotation and in a position at which one of said lands covers said outlet, and a detector arm mounted on said sleeve to project, when said sleeve is at said predetermined orientation, into the path of said cartons to be engaged by said cartons successively and to be moved by each to pivot said sleeve about its axis as said cartons are transported upon rotation of said table to rock said locking arm out of the path of said studs.

6. The machine of claim 5 wherein said detecting means comprises a vertical shaft, the lower end of said sleeve has a helical surface, a horizontal pin is mounted in said shaft to extend at opposite sides thereof, said helical end of said sleeve is being engaged on said pin and the weight of said sleeve constantly urges said helical surface to one position on said pin to locate said sleeve at said predetermined orientation.

7. A machine for filling cartons comprising a relatively fixed base plate adapted to support said cartons, a table rotatably mounted above said base plate and vertically spaced from said base plate, said table having a plurality of openings therethrough that are spaced equiangularly about its axis of rotation, a hopper mounted above said table, said table being indexable about its axis to move its openings successively from a loading station into registry with said hopper and back to said loading station again, a platform movably mounted at said loading station for movement vertically in an opening in said base plate, said platform being adapted to receive the carton being loaded or unloaded at said loading station, and means for locking said platform in a down position when it is depressed a predetermined distance, said locking means being disposed to be disengaged by a carton when the carton is placed properly on said platform.

8. A machine as claimed in claim 7 in which said locking means comprises a member fixed relative to said base, and a latch pivotally mounted relative to said platform for movement about a horizontal axis, said latch having a portion projecting upwardly above said platform, when said platform is depressed, in position to be engaged by a carton when the carton is pushed onto said platform.

9. A machine for loading cottage cheese and the like into generally cup-shaped wide-mouthed cartons comprising a base adapted to support said cartons, a rotatable table mounted above said base, a hopper having an outlet and mounted above said table with its outlet directed toward said table, said hopper being mounted on cushions to permit said hopper to move down and up within predetermined limits as the load of cheese in said hopper is increased and decreased, respectively, a resilient sleeve mounted on said hopper about said outlet for movement upon movement of said hopper to be pressed against said table in sealing engagement by pressure of the cheese in the hopper, said table being formed with a plurality of openings that are spaced about its axis of rotation for successive alignment with said outlet upon rotation of said table, said base being disposed substantially in parallelism with said table and in axially-spaced relation thereto, insert rings secured to said table in said openings respectively for insertion in the mouths of the cartons to engage the cartons and to transport them over said base upon rotation of said table, said rings being proportioned respectively, to displace in each said carton a predetermined volume thereby to limit the volume of cheese that can be transferred from said hopper to each carton, a platform mounted in said base in angularly-spaced relation to said outlet and for registry with one of said cartons when another of said cartons is in communication through its associated opening with said dispenser outlet, said platform being mounted for movement in a vertical direction from a position flush with said base to a lower position permitting the carton on said platform to be disengaged from the ring associated therewith.

10. A machine as claimed in claim 9 wherein said table is formed with lands between said openings and with a plurality of radially-projecting studs that are associated respectively with said openings, and means for detecting the cartons and in the absence of a carton to lock the table against rotation in a position in which one of said lands covers said outlet, said detecting means comprising a sleeve that is mounted for rotary movement about a vertical axis, means constantly to urge said sleeve to a predetermined orientation about said axis, a locking arm mounted on said sleeve to project, when said sleeve is at said predetermined orientation, into the path of said studs for engagement with said studs respectively, said locking arm being disposed upon engagement with a stud to hold said stud and said table against rotation and in a position at which one of said lands covers said outlet, and a detector arm mounted on said sleeve to project, when said sleeve is at said predetermined orientation, into the path of said cartons to be engaged by said cartons successively and to be moved by each carton to pivot said sleeve about its axis as said cartons are transported upon rotation of said table to rock said locking arm out of the path of said studs.

11. The machine of claim 9 including means constantly urging said platform in an upward direction, and latch means mounted to be locked when said platform is lowered to remove a carton and to be tripped to release said platform when a fresh carton is placed on said platform.

12. The machine of claim 10 including means constantly urging said platform in an upward direction, and latch means mounted to be locked when said platform is lowered to remove a carton and to be tripped to release said platform when a fresh carton is placed on said platform.

References Cited in the file of this patent

UNITED STATES PATENTS

| | | |
|---|---|---|
| 643,102 | Bates | Feb. 13, 1900 |
| 944,354 | Ayars | Dec. 28, 1909 |
| 1,386,810 | Thom | Aug. 9, 1921 |
| 1,561,032 | Small | Nov. 10, 1925 |
| 1,640,000 | Kendall | Aug. 23, 1927 |
| 1,778,216 | Hansen | Oct. 14, 1930 |
| 1,823,174 | Small | Sept. 15, 1931 |
| 2,015,164 | Thompson | Sept. 24, 1935 |
| 2,030,541 | Rose | Feb. 11, 1936 |
| 2,279,371 | Gordon | Apr. 14, 1942 |
| 2,280,614 | Ayars | Apr. 21, 1942 |
| 2,315,866 | McBean | Apr. 6, 1943 |
| 2,697,543 | Sawyer et al. | Dec. 21, 1954 |